US012800453B2

(12) United States Patent
Becker et al.

(10) Patent No.: US 12,800,453 B2
(45) Date of Patent: Nov. 17, 2026

(54) VALVE DEVICE, ADSORPTION DEVICE AND METHOD OF OPERATING ADSORPTION DEVICE

(71) Applicant: C. Gerhardt GmbH & Co. KG, Königswinter (DE)

(72) Inventors: Dennis Becker, Königswinter (DE); Uwe Jeub, Königswinter (DE); Tatjana Adamek, Königswinter (DE)

(73) Assignee: C. Gerhardt GmbH & Co. KG, Königswinter (DE)

( * ) Notice: Subject to any disclaimer, the term of this patent is extended or adjusted under 35 U.S.C. 154(b) by 694 days.

(21) Appl. No.: 18/214,135

(22) Filed: Jun. 26, 2023

(65) Prior Publication Data

US 2023/0417639 A1 Dec. 28, 2023

(30) Foreign Application Priority Data

Jun. 27, 2022 (EP) .................................... 22181263

(51) Int. Cl.
*G01N 1/40* (2006.01)
*B01L 3/00* (2006.01)
*B01L 7/00* (2006.01)

(52) U.S. Cl.
CPC ............ *G01N 1/405* (2013.01); *B01L 3/5023* (2013.01); *B01L 7/52* (2013.01); *B01L 2300/069* (2013.01); *B01L 2400/0622* (2013.01)

(58) Field of Classification Search
CPC ...... G01N 1/405; G01N 31/12; B01L 3/5023; B01L 7/52; B01L 2300/069; B01L 2400/0622; B01D 53/0438; B01D 2253/108; B01D 2257/504;
(Continued)

(56) References Cited

U.S. PATENT DOCUMENTS 3,632,471 A * 1/1972 Traube ..................... G21C 9/00
376/230
5,827,358 A * 10/1998 Kulish ............... B01D 53/0407
96/144
6,558,625 B1 5/2003 Deves et al.
(Continued)

FOREIGN PATENT DOCUMENTS

DE 10152359 A1 5/2003
DE 102005042300 A1 3/2007
(Continued)

*Primary Examiner* — John Mcguirk
(74) *Attorney, Agent, or Firm* — The Webb Law Firm

(57) ABSTRACT

The present disclosure relates to a valve device for an elemental analyzer including a first and a second ring line. The first and the second ring line each have an inlet and a plurality of outlets, each outlet being provided with a check valve, and the check valves being openable independently of each other. The present disclosure further relates to an adsorption device for an elemental analyzer. The adsorption device includes a first valve device and a plurality of filter units, each filter unit having an inlet and an outlet, and the filter units being connected to the first valve device such that each filter unit is connected via its inlet to a respective outlet of the first ring line and an outlet of the second ring line of the first valve device. The invention also relates to a method of operating an adsorption device for an elemental analyzer.

14 Claims, 4 Drawing Sheets

(58) Field of Classification Search
CPC ........... B01D 2259/40003; B01D 2259/40088; B01D 2259/402; B01D 53/0407
See application file for complete search history.

(56) References Cited

U.S. PATENT DOCUMENTS

| | | | | |
|---|---|---|---|---|
| 2005/0016379 | A1 | 1/2005 | Moeller et al. | |
| 2005/0266580 | A1 | 12/2005 | Italiano et al. | |
| 2005/0284550 | A1* | 12/2005 | Bicker | C23C 16/0272 148/692 |
| 2007/0051413 | A1* | 3/2007 | Schmutz | B41F 35/00 137/625.48 |
| 2007/0071393 | A1 | 3/2007 | Robertson et al. | |
| 2009/0192340 | A1* | 7/2009 | Culp | C07C 5/333 585/440 |
| 2009/0293717 | A1 | 12/2009 | Izumi et al. | |

FOREIGN PATENT DOCUMENTS

| | | | |
|---|---|---|---|
| EP | 1604567 | A1 | 12/2005 |
| EP | 2013615 | B1 | 1/2009 |
| JP | S61174028 | U | 10/1986 |
| JP | H05113391 | A * | 5/1993 |
| JP | H05288433 | A | 11/1993 |
| JP | 2005350145 | A | 12/2005 |
| JP | 2006317098 | A | 11/2006 |
| JP | 2013155091 | A | 8/2013 |
| JP | 2016065268 | A | 4/2016 |

* cited by examiner

VALVE DEVICE, ADSORPTION DEVICE AND METHOD OF OPERATING ADSORPTION DEVICE

CROSS-REFERENCE TO RELATED APPLICATION

This application claims priority to European Patent Application No. 22181263.9 filed Jun. 27, 2022, the disclosure of which is hereby incorporated by reference in its entirety.

BACKGROUND OF THE INVENTION

Field

The present disclosure relates to a valve device, an adsorption device for an elemental analyzer comprising the valve device, and a method of operating an adsorption device.

Description of Related Art

The present disclosure relates to the field of elemental analyzers. Elemental analyzers are used to determine the content of certain chemical elements in a sample. Such devices are used, for example, to determine the nitrogen content in organic samples, in particular in food samples. The nitrogen content can be used, for example, to draw conclusions about the protein content of a food sample.

In the elemental analysis of organic samples, the organic samples are first broken down into their elemental gas components by combustion. This produces combustion gases which, depending on the sample, have different compositions of gas substance combinations. The main gases are $CO_x$, water vapor, elemental nitrogen and nitrogen oxides. In order to break down the $CO_x$ and $NO_x$ combinations and allow them to react to form more easily manageable combinations, the combustion gas (also called sample gas) is first passed through a catalyst and then, in a second step, usually through a reduction reactor. Subsequently, water is usually removed from the sample gas stream by means of one or more water traps. In a further step, $CO_2$ is removed from the sample gas stream by means of an adsorption device for adsorbing $CO_2$. The sample gas stream thus obtained contains essentially only elemental nitrogen, the concentration of which in the sample gas stream can be determined in a final step by means of a detector, usually by means of a thermal conductivity detector.

The known adsorption devices contain an adsorbent material that binds $CO_2$ from the sample gas stream. For example, natural and synthetic zeolites, also known as molecular sieves, are used as adsorbent material. $CO_2$ is bound on the surface of the adsorbent material at room temperature. Once the adsorbent material is fully loaded with $CO_2$, it must first be regenerated before further use. Regeneration is accomplished by heating the adsorbent material, preferably to temperatures above 220° C. At elevated temperature, the adsorbent material releases the bound $CO_2$. For complete removal of the $CO_2$, a stream of purge gas is also passed through the adsorbent material. After regeneration, the adsorbent material is cooled down and can be reloaded.

Patent specification EP 2 013 615 B1 discloses an adsorption device for adsorption of $CO_2$ comprising a filter having an adsorbent material and a heating device for heating the adsorbent material. The adsorption device additionally comprises a valve device by means of which a sample gas flow and a purge gas flow can be alternately passed through the filter, the purge gas flow being passed through the filter in the opposite direction to the sample gas flow.

SUMMARY

It is the aim of the present disclosure to provide an improved adsorption device for adsorbing $CO_2$, with which, in particular, the regeneration of the adsorbing material can take place more effectively and efficiently. This means that bound $CO_2$ can be flushed out of the adsorbing material as completely as possible and with a minimum expenditure of energy and time. In addition, it should be possible to adjust the adsorption capacity of the adsorption device during operation so that samples with different contents of the element to be analyzed can be analyzed on the same elemental analyzer without costly conversions. In addition, the time required for regeneration during which the adsorption device is not available to analyze a sample should be minimized. Finally, the accuracy of the analysis should be increased by minimizing systematic measurement errors.

To solve this problem, the present disclosure discloses a valve device for an elemental analyzer, an adsorption device an elemental analyzer comprising the valve device, and a method of operating the adsorption device.

Valve Device

The valve device for an elemental analyzer according to the present disclosure is characterized in that the valve device comprises a first and a second ring line, the first and the second ring line each have an inlet and a plurality of outlets, each outlet is provided with a check valve, and the check valves can be opened independently of each other.

The valve device can be used in such a way that different consumers are connected to the individual outlets of the two ring lines and different fluids are fed into the ring lines and to the consumers via the inlets of the ring lines. Each of the ring lines of the valve device, together with its inlet and outlets, forms a line system for a fluid. Preferably, the consumers are each connected to an outlet of the first ring line and an outlet of the second ring line. This means that the consumers can be supplied with fluid from either the first or the second ring line. Preferably, the valve device is used as part of an adsorption device of an elemental analyzer, wherein the consumers are the individual filter units of the adsorption device.

The valve device makes it possible to route two different fluids via the two ring lines and to supply the fluids via the respective outlets of the ring lines to different consumers, in particular to the filter units of an adsorption device. One or more consumers can thus be supplied with fluid from each ring line. Since the individual outlets are each closed by check valves that can be opened independently of one another, the fluids can be directed specifically via individual outlets. This allows great flexibility in the operation of the valve device. For example, several consumers can be supplied with fluid in parallel. It is also possible at the same time for a first group of consumers to be supplied with fluid from the first ring line, for a second group of consumers to be supplied with fluid from the second ring line, and for a third group of consumers to be disconnected from both ring lines by closing the respective check valves.

The valve device may be designed for any fluid. In the context of the present disclosure, the term “fluid” refers to a liquid or a gas, or a mixture with liquid and gaseous components. In this context, a fluid may also contain solid particles, for example soot particles, as long as the particle size and quantity of the solid particles do not lead to an impairment, in particular a blockage, of the valve device. Preferably, the fluid is a gas or a gaseous mixture, particularly preferably a gaseous mixture that may contain water vapor. Particularly preferably, the fluid comprises only gaseous components.

In the context of this description, the terms “inlet” and “outlet” each refer to connections of a piping system. Unless otherwise indicated, these terms are not intended to impose any restriction on the direction of flow of the fluid carried in the piping system. For example, it is possible to direct a fluid through a port designated as an “outlet” to a port designated as an “inlet” and vice versa.

The use of ring lines has the advantage that the difference in the distance covered by the fluid between the inlet and the individual outlets is minimized. This results in a uniform distribution of the fluid over the individual outlets. In addition, fluid flows through the entire line section, thus reducing the dead volume in the line system.

Each of the ring lines includes one inlet and several, i.e. at least two outlets.

The distances between the inlets and outlets of each ring line can be adjusted as required. The distance is defined as the distance a fluid travels between the inlet and outlet along the respective ring line.

Preferably, the inlet of each ring line is equally spaced from each of the two immediately adjacent outlets of the same ring line. In other words, for a single ring line, the distance that the fluid travels between the inlet and the outlets located immediately to the right and left of the inlet is equal, so that a uniform distribution of the fluid between the two immediately adjacent outlets is achieved. Immediately adjacent outlets are defined as the closest outlets as seen along the ring line in a clockwise or counterclockwise direction.

Preferably, it is also provided that the outlets of a ring line are evenly spaced apart. This minimizes the differences in distance between individual outlets and achieves uniform distribution of the fluid over the individual outlets.

In a preferred embodiment, the outlets of the two ring lines are each connected to one another in pairs by a connecting line, with a further outlet being arranged in each connecting line. The ring lines each have the same number of outlets, so that the outlets can be assigned to each other in pairs. Each pair of outlets is thus assigned a connecting line with a single outlet. The connecting line allows the ring lines to be connected to each other and simultaneously to a group of consumers.

In this embodiment, each outlet of a connecting line can be connected to a consumer, so that each consumer is connected to both ring lines. A single consumer, e.g. a filter unit described below, can thus be supplied via each connecting line. By controlling the check valves at the individual outlets of the ring lines, it can be determined independently for each consumer with which of the two fluids the consumer is supplied. It is thus possible to simultaneously supply one or more consumers with the fluid from the first ring line and one or more further consumers with the fluid from the second ring line.

Preferably, each connecting line provides that the outlet of the connecting line is equally spaced from the two connected outlets of the two ring lines so that the path length between the outlet of the connecting line and the two ring lines is the same.

The check valves are preferably electronically or pneumatically controlled. The valve control can thus be connected to an electronic control unit which opens and closes the check valves automatically and independently. The check valves are preferably controlled according to a predefined program.

The check valves are 2/2-way valves, each of which has an input and an output and can be switched between a closed and an open state. Preferably, the check valves are closed in the de-energized state. This has the advantage that the fluid supply to the consumers connected to the ring lines is automatically interrupted in the event of a power supply failure, thus preventing possible contamination of the consumers.

In a preferred embodiment, the two ring lines and the inlets and outlets connected to each ring line form a structural unit. For example, the two ring lines can be formed in the form of holes in a cuboid block, for example a plastic or metal block. Both ring lines are thereby combined in one block and thus in one structural unit. Preferably, the block is made of metal, in particular brass. The inlets of the two ring lines are preferably provided on opposite side faces of the block. The outlets of the two ring lines are preferably provided together on one side surface, particularly preferably on the side surface arranged between the two side surfaces with the inlets. In this embodiment, the check valves are preferably attached to the side surface with the outlets, and can be plugged or screwed on there, for example. Furthermore, in this embodiment it is preferred that the outlets of the two ring lines are connected in pairs to a connecting line as described above, which has a further outlet. The connecting lines are also in the form of holes in the block. The connecting lines extend into the metal block from the side surface with the check valves. The outlets of the connecting lines are preferably arranged on the same side surface as the check valves.

Adsorption Device

The adsorption device for an elemental analyzer according to the present disclosure comprises a first valve device of the type described above and a plurality of filter units, each filter unit having an inlet and an outlet, characterized in that the filter units are connected to the first valve device in such a way that each filter unit is connected via its inlet to a respective outlet of the first ring line and an outlet of the second ring line of the first valve device.

By using the valve device described above in the context of an adsorption device, it is possible to make use of the advantages of the valve device in the context of an elemental analyzer. In particular, with the aid of the valve device, it is possible to direct different fluids to individual filter units via the two ring lines of the valve device. For example, a sample fluid can be fed via the first ring line to one or more filter units in order to remove a component of the sample fluid from the sample fluid by adsorption, and at the same time a flushing fluid can be fed via the second ring line to one or more further filter units in order to regenerate the further filter units.

The adsorption device comprises two or more filter units. It is thus possible to apply a sample fluid to one of the filter units while simultaneously passing a flushing fluid through a second filter unit. One or more filter units are thus used to remove a constituent from a sample fluid, while one or more other filter units are simultaneously regenerated. In this way, it is possible to reduce downtime in the operation of the adsorption device. Preferably, the adsorption device comprises two to ten filter units, more preferably four to eight filter units, most preferably six filter units.

The filter units each have an inlet for a fluid, an outlet for a fluid, and a filter with an adsorbent material through which the fluid can flow. The shape of the filter units is not specified in more detail. For example, U-shaped filter units known from the prior art with an external heating device can be used. It is equally possible to use spiral-shaped or straight filter units with an internal heating device.

Furthermore, the filter units preferably each have a heating device with which the adsorbent material can be heated. By means of the heating device, the adsorbent material can be heated during the regeneration phase in order to desorb the components adsorbed from the sample fluid and to flush them out of the adsorbent material by means of the flushing fluid.

The filter units preferably also have a cooling device for cooling the adsorbent material. With the aid of the cooling device, it is possible to cool the adsorbent material within a short time after regeneration to the temperature required for adsorption of components of the sample fluid and thus make it ready for operation. The cooling device is preferably a fan.

The adsorbent material is preferably a $CO_2$-adsorbent material. This is suitable for removing $CO_2$ from a sample fluid, preferably from a gaseous sample fluid. Preferably, the adsorbent material is a molecular sieve. Particularly preferably, the adsorbent material consists of natural or synthetic zeolites. To improve the adsorption properties, the adsorbent material can also be coated.

In a preferred embodiment, the adsorption device comprises a second valve device of the type described above, wherein the filter units are connected to the second valve device such that each filter unit is connected via its outlet to a respective outlet of the first ring line and an outlet of the second ring line of the second valve device.

In this embodiment, the adsorption device thus comprises a total of four ring lines, two of which are connected to the inlets of each of the filter units and two of which are connected to the outlets of each of the filter units.

This embodiment allows the fluid, after flowing through the filter units, to be passed on to different recipients via one of the two ring lines of the second valve device. For example, after flowing through the filter units, the fluid can be directed to a detector via the first ring line of the second valve device. Alternatively, after flowing through the filter units, the fluid can be directed via the second ring line of the second valve device to a second detector or an outlet.

The fact that the check valves of the second valve device, like those of the first valve device, can be opened or closed independently of one another means that the fluid can be passed from different filter units to different recipients. For example, a sample fluid can be passed via the first ring line of the first valve device to one or more first filter units and from there via the first ring line of the second valve device to a detector, while at the same time a flushing fluid can be passed via the second ring line of the first valve device to one or more second filter units and from there via the second ring line of the second valve device to an outlet.

In the examples described above, the fluids are each fed into the adsorption device via the inlets of the ring lines of the first valve device and leave the adsorption device via the inlets of the ring lines of the second valve device. The fluids flow through the filter units in the same direction in each case. However, it is also possible to set the adsorption unit in such a way that a first fluid is fed via the first ring line of the first valve device to the filter units and from there to the first ring line of the second valve device, while a second fluid is fed via the second ring line of the second valve device to the filter units and from there to the second ring line of the first valve device. In this embodiment, the fluids flow through the filter units in opposite directions.

In order to minimize the travel distance differences between the filter units and the two ring lines, the inlets of the filter units are preferably evenly spaced from the respective connected outlets of the ring lines. The same applies to the distances between the outlets of the filter units and the associated outlets of the second valve device, if a second valve device is provided.

The adsorption device preferably comprises an electronic control unit with which the check valves of the first valve device and of the second valve device, if present, can be controlled. The control unit is preferably also connected to the heating devices and the cooling devices, if any, of the filter units, so that the control of the check valves and the heating and cooling devices is taken over by a central control unit.

The adsorption device is preferably intended for use in an elemental analyzer, preferably for use in an elemental analyzer for analyzing organic samples, most preferably for use in an elemental analyzer for analyzing food samples, most preferably for use in an elemental analyzer for determining the nitrogen content in a food sample. However, the adsorption device may also be intended for any other application where a component, in particular $CO_2$, needs to be removed from a fluid and adapted accordingly.

The adsorption device is designed for adsorption of components from any fluid. The fluid may contain liquid and gaseous components. In addition, the fluid may also contain solid particles, for example soot particles, as long as the particle size and quantity of the solid particles do not lead to an impairment of the adsorbing material. Preferably, the fluid is a gas or a gaseous mixture, particularly preferably a gaseous mixture that may contain water vapor, most preferably the fluid comprises only gaseous components.

Method of Operating an Adsorption Device

The method of operating an adsorption device for an elemental analyzer according to the present disclosure comprises the steps of:

a) providing an adsorption device described above;
b) passing a sample fluid through the first ring line of the first valve device of the adsorption device to at least one of the filter units of the adsorption device so that a component of the sample fluid is adsorbed in the filter unit;

and optionally c) passing a flushing fluid through the second ring line of the first valve device of the adsorption device to at least one further one of the filter units of the adsorption device so that adsorbed components are flushed out of the filter unit.

When the sample fluid is passed through the first ring line, the check valves of those outlets of the first ring line which are connected to the filter units intended for adsorption are opened. The other check valves of the first ring line and the check valves of the corresponding outlets of the second ring line remain closed.

When the flushing fluid is passed through the second ring line, the check valves of those outlets of the second ring line which are connected to the filter units intended for regeneration are opened. The other check valves of the second ring line and the check valves of the corresponding outlets of the first ring line remain closed.

It is also possible for one or more filter units to be completely disconnected from the first and second ring lines by closing the corresponding check valves, while sample fluid or flushing fluid is passed through other filter units.

Steps b) and c) can be carried out simultaneously or with a time delay. Preferably, they are carried out simultaneously or at least with a time overlap during operation of the adsorption device in order to minimize the downtimes of the filter units to be regenerated. Provided they are performed with a time overlap, the flushing fluid in step c) is passed through a different filter unit than the sample fluid in step b). If the steps are carried out without time overlap, the filter unit in steps b) and c) can also be the same filter unit.

In a preferred embodiment, the sample fluid is passed through two or more filter units simultaneously so that a component of the sample fluid is adsorbed in the filter units. In this way it is possible to multiply the adsorption capacity.

In a further embodiment, an adsorption device is used comprising a second valve device as described above. In this embodiment, the method comprises the step that the sample fluid, after having been passed through the at least one filter unit, is passed into the first ring line of the second valve device and from there to a detector. This is done by opening the check valves of those outlets of the first ring line of the second valve device which are connected to the outlet of the filter unit concerned, and closing the corresponding outlets of the second ring line of the second valve device.

In a further embodiment, the rinsing fluid, after having been passed through one or more filter units, is passed through an additional detector for the detection of the desorbed component. In this way, it is possible to determine the amount of the originally adsorbed component and thus to draw conclusions about the amount of the component in the sample fluid. Preferably, a second valve device as described above is used for this purpose, with the flushing fluid being passed through the second ring line of the second valve device and from there to the additional detector. It is also possible to direct the flushing fluid, after it has been passed through one or more filter units, to the same detector as the sample fluid. Preferably, a second valve device as described above is used for this purpose, whereby the flushing fluid is passed through the first ring line of the second valve device and from there to the detector.

The method is suitable for removing constituents from any fluid stream, which in the context of the method is referred to as a sample fluid. The fluid stream may contain liquid and gaseous constituents. In addition, the fluid stream may also contain solid particles, for example soot particles, as long as the particle size and amount of solid particles do not lead to an impairment of the adsorbent material. Preferably, the fluid stream is a gas or a gaseous mixture, most preferably it is a gaseous mixture that may contain water vapor, most preferably the fluid stream comprises only gaseous components. The method is preferably used to remove $CO_2$ from a sample fluid.

In one embodiment, the sample fluid is a $CO_2$-containing fluid stream obtained by combustion of a sample, preferably an organic sample, more preferably a food or animal feed sample. Preferably, the fluid stream is obtained by the following steps:

Burning a sample in a combustion reactor to obtain an analysis fluid; passing the analysis fluid through a reduction reactor to reduce oxidized components of the analysis fluid; passing the analysis fluid through a water separator to remove water from the analysis fluid.

Preferably, the fluid stream containing $CO_2$ is passed through the filter units of the adsorption device at a temperature of 10° C. to 40° C., preferably a temperature of 15° C. to 30° C., more preferably a temperature of 18° C. to 25° C., so that $CO_2$ is adsorbed from the fluid stream by the adsorbent material.

After the $CO_2$-containing fluid stream has been passed through the adsorption device, the adsorbed $CO_2$ is flushed out of the adsorbent material by heating the adsorbent material by means of the heating device and passing a flushing fluid stream through the adsorption device. Preferably, the adsorbent material is thereby heated to a core temperature between 100° C. and 300° C., preferably 150° C. and 250° C., more preferably 180° C. and 220° C. In a particularly preferred embodiment, the adsorbent material is first heated to the specified core temperature and then the flushing fluid stream is passed through the adsorption device and through the adsorbent material.

When the adsorbent material is heated, a pressure increase can occur in the filter unit due to the release of the adsorbed component and thermal expansion of the fluid. To compensate for this pressure increase, the filter unit is preferably vented during heating. If a second valve device is used as described above, venting is preferably performed via the second ring line of the second valve device by opening the corresponding check valve.

The flushing fluid used is preferably a fluid that does not itself contain any components that are adsorbed by the adsorbing material or that react chemically with the adsorbing material. Preferably, the flushing fluid is a gas or a gaseous mixture. Preferably, the flushing fluid is a noble gas, for example helium or argon. In a preferred embodiment, helium is used as the flushing fluid.

In a preferred embodiment, the filter units of the adsorption device comprise a cooling device described above. In this case, the process comprises the additional step of cooling the adsorbent material by means of the cooling device after the adsorbed component has been flushed out of the adsorbent material. During cooling of the adsorbent material by means of the cooling device, the flushing fluid flow may be shut off or may continue to pass through the adsorbent material.

In a further embodiment, the sample fluid of similar samples is always passed through the same filter unit of the adsorption device. In this way, it is possible to minimize or completely eliminate systematic measurement errors that can occur due to individual differences between the filter units. Preferably, the adsorption device comprises an electronic memory unit for storing identification data of samples and filter units for this purpose. Thus, it is possible to assign samples to a specific filter unit on the basis of their identification data.

BRIEF DESCRIPTION OF THE DRAWINGS

The terms FIG., FIGS., Figure, and Figures are used interchangeably in the specification to refer to the corresponding figures in the drawings.

Further features of the present disclosure are illustrated with reference to the drawings described below.

DESCRIPTION

Figure 1:
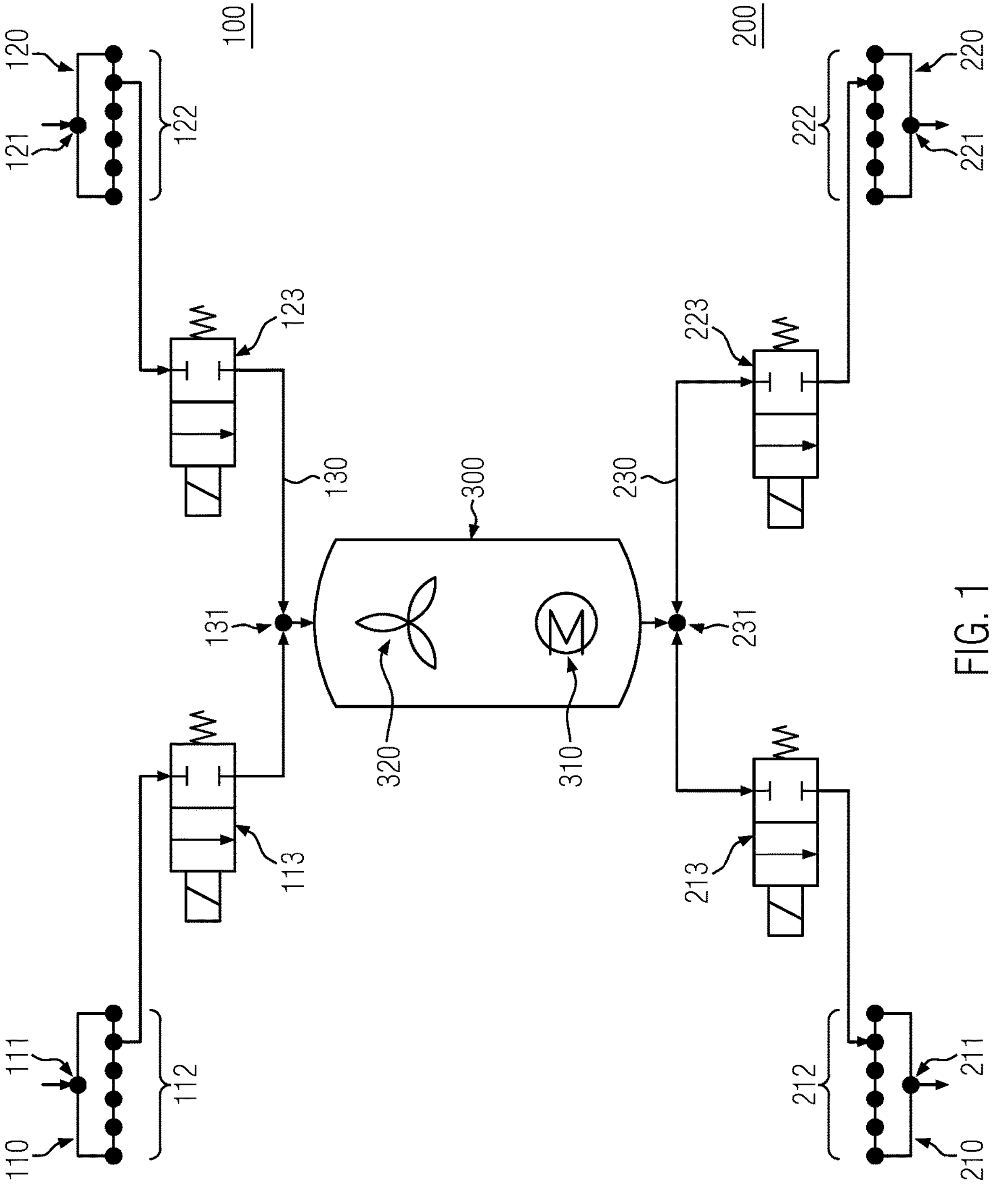
FIG. 1 Schematic representation of an adsorption device at rest

FIGS. 1 to 4 each show schematic representations of an adsorption unit 1 in different operating states.

The adsorption unit 1 has a first valve device 100, which comprises the two ring lines 110, 120. The ring line 110 has an inlet 111 and six outlets 112. The ring line 120 has a corresponding inlet 121 and likewise six outlets 122. In the example shown here, the ring line 110 is used to pass a sample fluid that is fed through the inlet 111 into the ring line 110. In the example described herein, the sample fluid is a $CO_2$-containing gaseous mixture that is obtained by burning a food sample. The ring line 120 is used to pass a flushing fluid, which is fed through the inlet 121. The flushing fluid here is an inert gas that is used to purge $CO_2$ from the adsorbent material described below.

The ring lines 110, 120 are shown spatially separated in the schematic representation of FIGS. 1 to 4 for a better overview. In the example described here, however, the ring lines 110, 120 actually form a structural unit.

Figure 2:
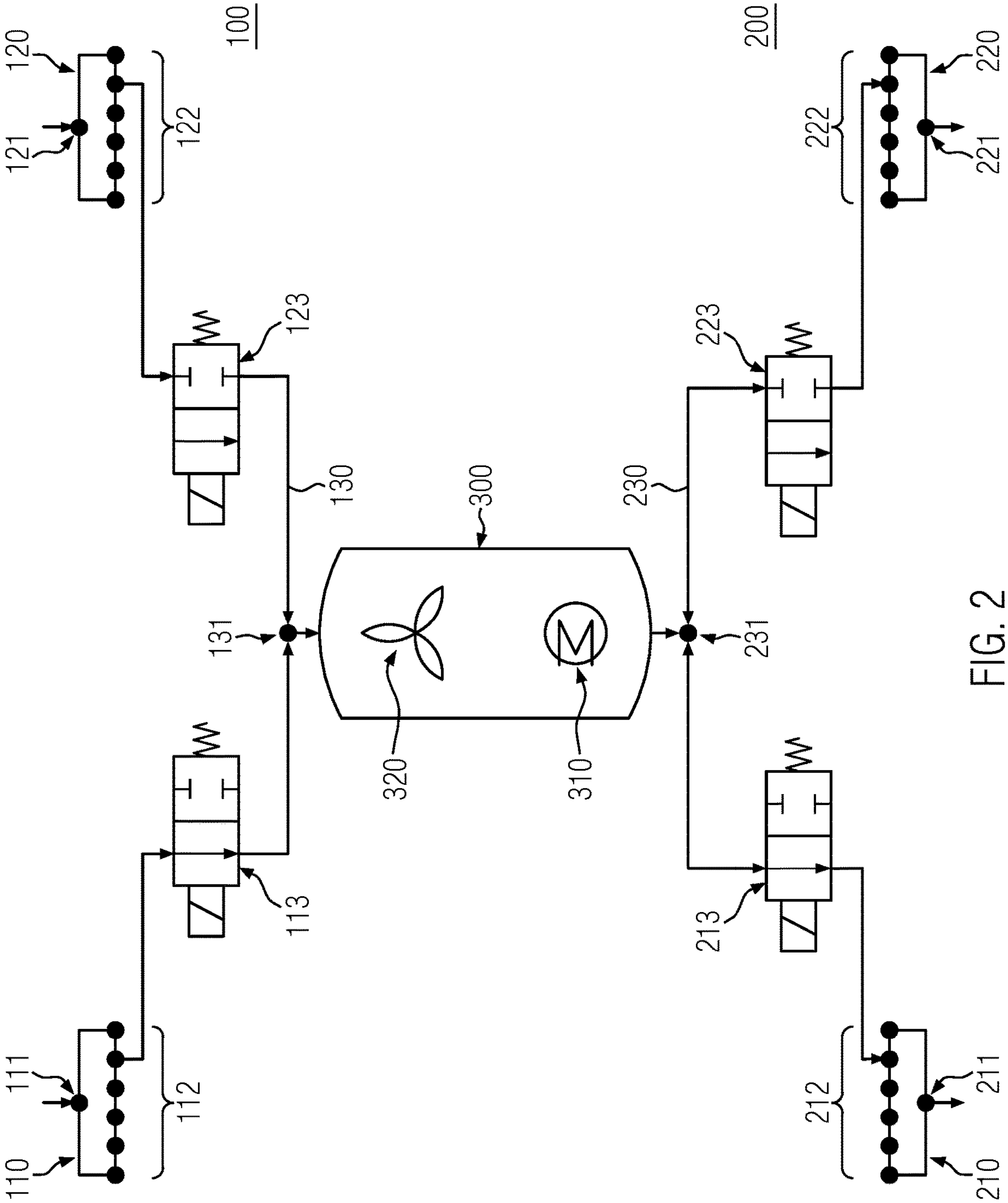
FIG. 2 Schematic representation of an adsorption device when passing a sample fluid through a filter unit FIG. 3 Schematic representation of an adsorption device when passing a flushing fluid through a filter unit FIG. 4 Schematic representation of an adsorption device during simultaneous passage of a sample fluid through two filter units
Figure 3:
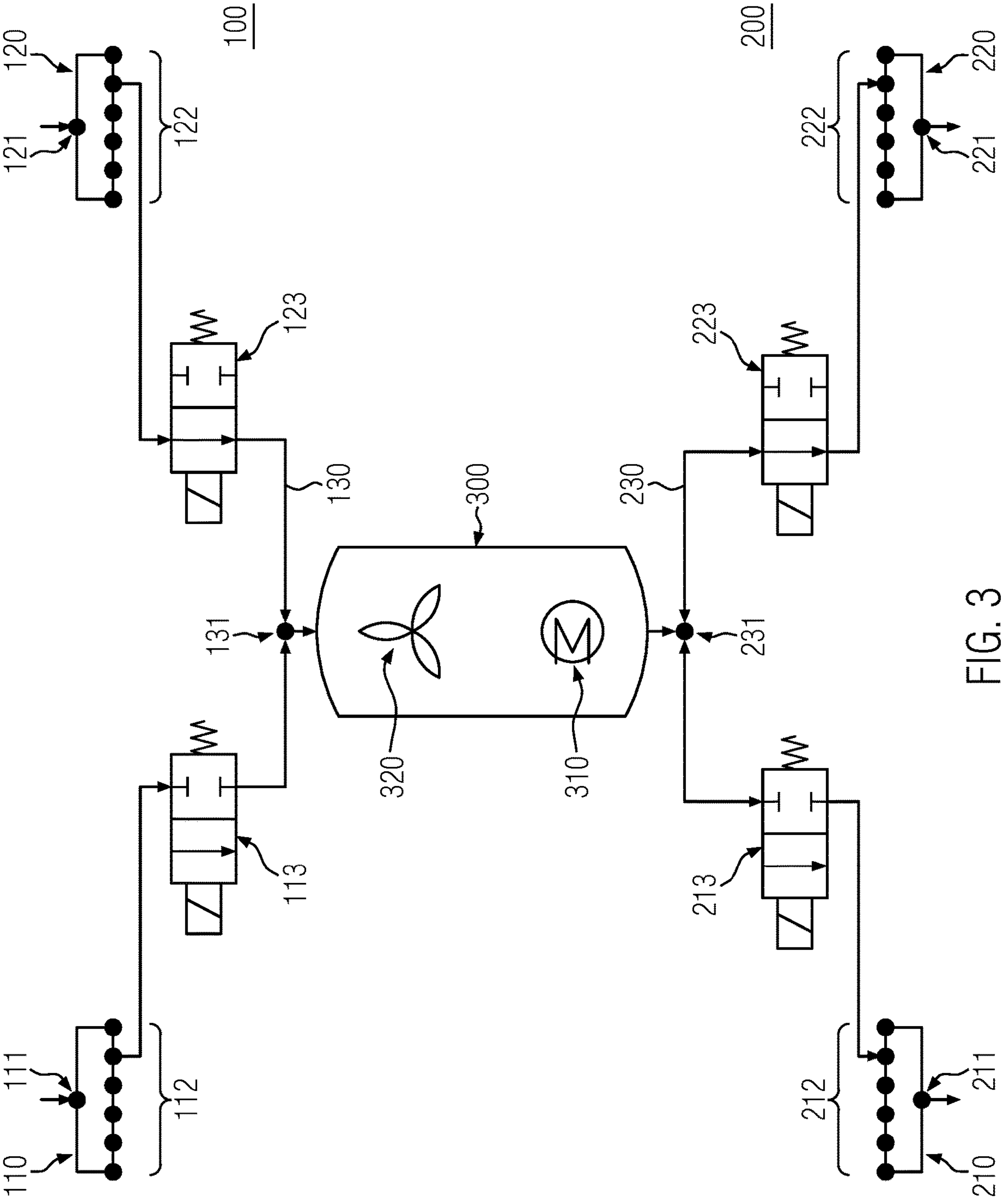

The outlets 112, 122 of the two ring lines 110, 120 are each provided with check valves 113, 123, one of which is shown schematically per ring line in FIGS. 1 to 3. The other check valves are not shown for a better overview.

The outlets of the check valves 113, 123 are connected to each other via a connecting line 130. Thus, the outlets 112, 122 of the two ring lines 110, 120 associated with the check valves 113, 123 are connected to each other at the same time. The valve device 100 has a total of six connecting lines 130, of which only one is shown in FIGS. 1 to 3. The individual connecting lines 130 each connect two check valves 113, 123 and the corresponding outlets 112, 122 of the ring lines 110, 120 to one another in pairs.

Each of the connecting lines 130 has an additional outlet 131 which is connected to a filter unit 300. The adsorption device 1 comprises a total of six filter units 300, only one of which is shown in FIGS. 1 to 3. Each of the filter units 300 comprises a heating device 310 and a cooling device 320. The filter units 300 comprise an adsorbent material for adsorbing a constituent from the sample fluid. In the example shown herein, the material is a $CO_2$-adsorbing material.

In the example shown here, the adsorption device 1 comprises a second valve device 200 which is constructed correspondingly to the first valve device 100. The second valve device 200 comprises two ring lines 210, 220, each having an inlet 211, 221 and six outlets 212, 222. As with the first valve device 100, the ring lines 210, 220 of the second valve device 200 form a structural unit. The outlets 212, 222 are provided with check valves 213, 223, of which only one per ring line is shown in FIGS. 1 to 3. The check valves 213, 223 are each connected in pairs via connecting lines 230, only one of which is shown in FIGS. 1 to 3. Each connecting line 230 has an additional outlet 231, each of which is connected to the outlet of a filter unit 300.

FIG. 1 shows the adsorption device 1 in a resting state with respect to a filter unit. In this state, all check valves 113, 123, 213, 223 leading to the filter unit 300 shown are closed, so that no fluid is passed through the filter unit 300 shown. Thus, the filter unit 300 shown is in the idle state. By allowing the check valves 113, 123, 213, 223 to be opened or closed independently of each other, it is possible for only some of the total of six filter units 300 to be in the idle state, while at the same time other filter units can be in one of the states shown in FIGS. 2 and 3.

The resting state is used in conjunction with a control of the heating device 310 and the cooling device 320, in particular for preparing the adsorption or regeneration phase described below. Advantageously, after adsorption has been completed, the filter unit 300 is placed in the resting state by closing the check valves 113, 123, 213, 223, and during the resting state the heating device 310 is activated in order to heat the adsorbing material to the temperature required for regeneration. Preferably, during heating, the check valve 223 is opened at least temporarily to allow the filter unit 300 to be vented via the ring line 220 and to prevent overpressure in the filter unit 300. Accordingly, after regeneration is complete, the filter unit 300 is again placed in the resting state and, meanwhile, the cooling device 320 is activated to cool the adsorbing material to the temperature required for adsorption.

FIG. 2 shows the adsorption device 1 passing the sample fluid through a filter unit 300. In this state, adsorption takes place, i.e. a component of the sample fluid, in this example $CO_2$, is removed from the sample fluid by binding to the adsorbent material of the filter unit 300. For this purpose, the check valve 113 is opened while the check valve 123 remains closed. As a result, sample fluid from the first ring line 110 enters the filter unit 300. The heating device 310 is inactive during this process, and the cooling device 320 can be activated if necessary to cool the adsorbent material. In the second valve device 200, the check valve 213 is simultaneously opened while the check valve 223 remains closed. As a result, the sample fluid, after flowing through the filter unit 300, enters the ring line 210 of the second valve device 200. The sample fluid leaves the second valve device 200 via the inlet 211.

In the example described herein, inlet 211 is connected to a detector for detecting nitrogen in the sample fluid. The sample fluid thus reaches the detector after $CO_2$ is removed by the filter unit 300.

FIG. 3 shows the adsorption device 1 passing the flushing fluid through a filter unit 300. In this state, regeneration takes place, i.e. the adsorbed component, in this example $CO_2$, is desorbed from the adsorbing material at elevated temperature and flushed out of the filter unit 300. For this purpose, the check valve 123 is opened while the check valve 113 remains closed. As a result, flushing fluid from the second ring line 120 enters the filter unit 300, with the heating device 310 being active to heat the adsorbent material and the cooling device 320 being inactive. In the second valve device 200, the check valve 223 is simultaneously opened while the check valve 213 remains closed. As a result, the flushing fluid, after flowing through the filter unit 300, enters the ring line 220 of the second valve device 200. The flushing fluid leaves the second valve device 200 via the inlet 221.

In the example described herein, inlet 221 may be connected to a detector for detecting $CO_2$ in the flushing fluid. The flushing fluid containing the purged $CO_2$ thus reaches the detector for detecting $CO_2$, so that the amount of purged $CO_2$ can be measured. Alternatively, the flushing fluid is directed out of the adsorption device 1 via the inlet 221 and discarded.

Figure 4:
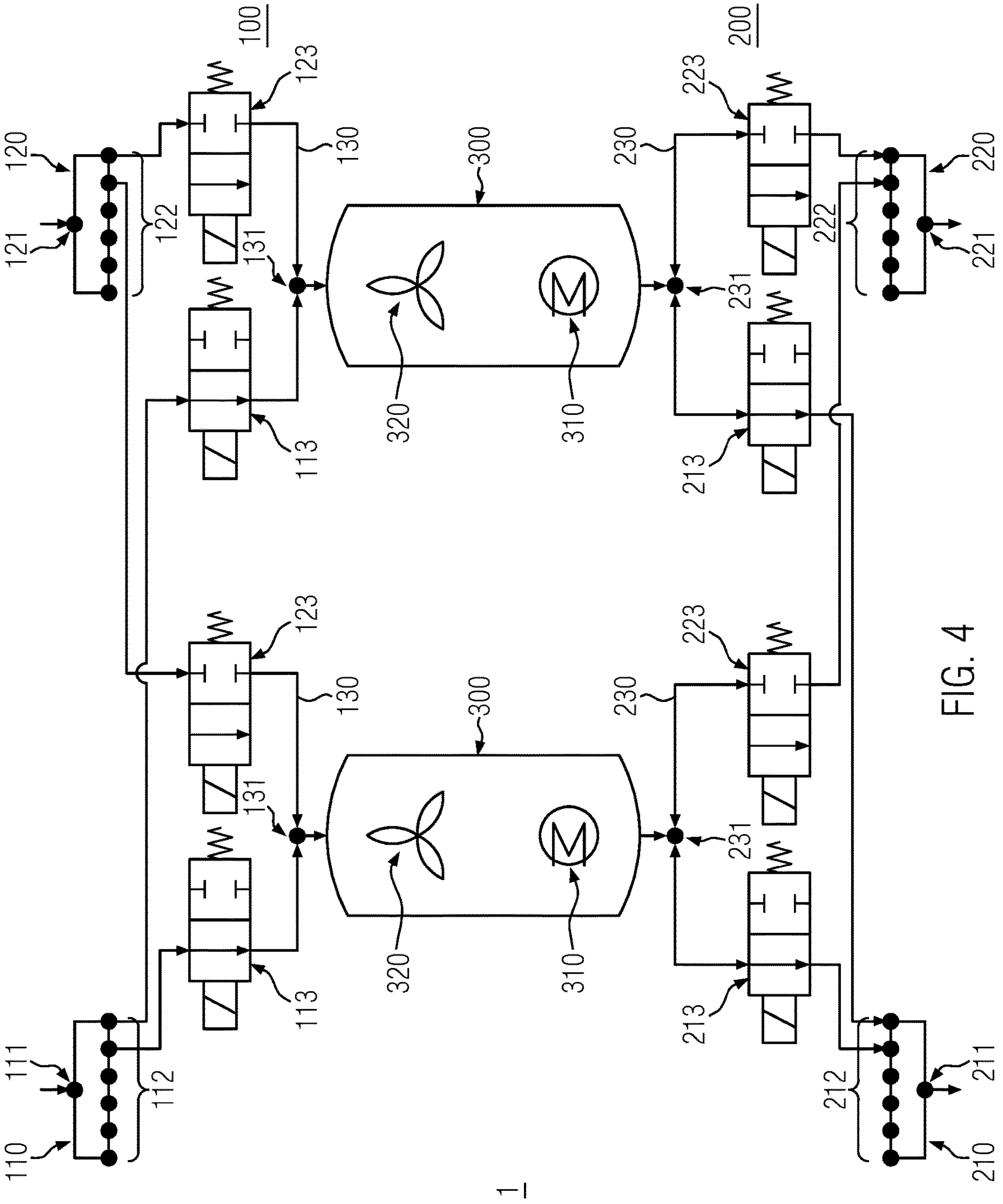

FIG. 4 shows the adsorption device 1 simultaneously passing a sample fluid through two filter units 300. The adsorption device 1 has basically the same design as in FIGS. 1 to 3. However, for clarification purposes, two of the total of six filter units 300 are explicitly shown in FIG. 4 together with the check valves 113, 123, 213, 223 connected to them. In the condition shown in FIG. 4, two check valves 113 are open while the corresponding check valves 123 are closed. As a result, the sample fluid from the first ring line 110 is simultaneously passed through two filter units 300.

The filter units 300 are connected in parallel. This doubles the amount of adsorbent material available and thus the adsorption capacity for adsorbing $CO_2$. The filter units 300 are thus both in adsorption mode, similar to the filter unit shown in FIG. 2. The heating devices 310 are inactive in this case, and the cooling devices 320 can be activated if necessary to cool the adsorbing material. In the second valve device 200, the check valves 213 are simultaneously opened while the check valves 223 remain closed. As a result, the two sample fluid streams from the filter units 300 enter the ring line 210 of the second valve device 200 together. Via the inlet 211, the combined sample fluid leaves the second valve device 200 and can be directed to a detector as described above. The remaining filter units 300 not shown in FIG. 4 can meanwhile be either in the resting state according to FIG. 1, in the regeneration mode according to FIG. 3 or also in the adsorption mode.

Although the disclosed subject matter has been described in detail for the purpose of illustration based on what is currently considered to be the most practical and preferred embodiments, it is to be understood that such detail is solely for that purpose and that the disclosed subject matter is not limited to the disclosed embodiments, but, on the contrary, is intended to cover modifications and equivalent arrangements that are within the spirit and scope of the appended claims. For example, it is to be understood that the presently disclosed subject matter contemplates that, to the extent possible, one or more features of any embodiment can be combined with one or more features of any other embodiment.

LIST OF REFERENCE SIGNS

1 Adsorption device
100, 200 Valve devices
110, 120, 210, 220 Ring line
111, 121, 211, 221 Inlets
112, 122, 212, 222 Outlets
113, 123, 213, 223 Check valves
130, 230 connection line
131, 231 Outlets
300 Filter unit
310 Heating device
320 Cooling device

The invention claimed is:

1. A valve device for an elemental analyzer, the valve device comprising first and second ring lines, wherein the valve device is designed for routing a gas or a gaseous mixture, wherein each ring line is a line wherein the gas or gaseous mixture is provided from at least one point of introduction along two opposite extensions or flow paths, the first and second ring lines each having an inlet and a plurality of outlets, each outlet being provided with a check valve, and the check valves being openable independently of each other.

2. The valve device according to claim 1, wherein the outlets of the two ring lines are each connected to one another in pairs by a respective connecting line, a further outlet being arranged in each connecting line.

3. The valve device according to claim 1, wherein the two ring lines as well as the inlets and outlets respectively connected to the ring lines form a structural unit.

4. The valve device according to claim 3, wherein the two ring lines are formed in the form of bores in a cuboid block.

5. The valve device according to claim 1, wherein the inlet of each ring line is equally spaced from the two immediately adjacent outlets of the same ring line, respectively, and in that the outlets of a ring line are equally spaced from each other, respectively.

6. The valve device according to claim 1, wherein the valve device comprises an electronic control unit for electronically or pneumatically controlling the check valves.

7. The valve device according to claim 6, wherein the check valves are electronically controlled and are closed in the de-energized state.

8. An adsorption device for an elemental analyzer, the adsorption device comprising a first valve device according to claim 1 and a plurality of filter units, each filter unit having an inlet and an outlet, wherein the filter units are connected to the first valve device in such a way that each filter unit is connected via its inlet to a respective outlet of the first ring line and an outlet of the second ring line of the first valve device.

9. The adsorption device according to claim 8, wherein the adsorption device further comprises a second valve device comprising first and second ring lines, wherein the second valve device is designed for routing a gas or a gaseous mixture, wherein each ring line is a line wherein the gas or gaseous mixture is provided from at least one point of introduction along two opposite extensions or flow paths, the first and second ring lines of the second valve device each having an inlet and a plurality of outlets, each outlet of the first and second ring lines of the second valve device being provided with a check valve, and the check valves of the outlets of the first and second ring lines of the second valve device being openable independently of each other, wherein the filter units are connected to the second valve device in such a way that each filter unit is connected via its outlet to a respective outlet of the first ring line of the second valve device and an outlet of the second ring line of the second valve device.

10. The adsorption device according to claim 8, wherein each filter unit comprises an adsorbent material, a heating device for heating the adsorbent material, and optionally a cooling device for cooling the adsorbent material.

11. A method of operating an adsorption device for an elemental analyzer, comprising the steps of:

(a) providing an adsorption device according to claim 8;

(b) passing a sample fluid through the first ring line of the first valve device of the adsorption device to at least one of the filter units of the adsorption device so that a component of the sample fluid is adsorbed in the filter unit;

and, if regeneration of at least one further one of the filter units is required, (c) passing a flushing fluid through the second ring line of the first valve device of the adsorption device to the at least one further one of the filter units of the adsorption device, so that adsorbed constituents are flushed out of the filter unit and the at least one further one of the filter units is regenerated.

12. The method of claim 11, wherein the sample fluid is passed simultaneously through two or more filter units such that a component of the sample fluid is adsorbed in the filter units.

13. The method according to claim 11, wherein the flushing fluid, after passing through the at least one further filter unit, is passed through a detector for detecting the component flushed out of the filter unit.

14. The method according to claim 11, wherein the sample fluid and the flushing fluid are gases or gaseous mixtures.

* * * * *